US010415853B2

(12) United States Patent
Habdank

(10) Patent No.: US 10,415,853 B2
(45) Date of Patent: Sep. 17, 2019

(54) TRACKING DEVICE

(71) Applicant: Habdank PV-Montagesysteme GmbH & Co. KG, Göppingen (DE)

(72) Inventor: Martin Habdank, Heiningen (DE)

(73) Assignee: Habdank PV-Montagesysteme GmbH & Co. KG, Göppingen (DE)

( * ) Notice: Subject to any disclaimer, the term of this patent is extended or adjusted under 35 U.S.C. 154(b) by 130 days.

(21) Appl. No.: 15/574,160

(22) PCT Filed: Jun. 1, 2015

(86) PCT No.: PCT/EP2015/062074
§ 371 (c)(1),
(2) Date: Nov. 15, 2017

(87) PCT Pub. No.: WO2016/192766
PCT Pub. Date: Dec. 8, 2016

(65) Prior Publication Data
US 2018/0128515 A1 May 10, 2018

(51) Int. Cl.
| F24S 30/425 | (2018.01) |
| F24S 25/70 | (2018.01) |
| F24S 50/20 | (2018.01) |
| H02S 20/32 | (2014.01) |
| F24S 25/12 | (2018.01) |
| F24S 25/00 | (2018.01) |
| F24S 30/00 | (2018.01) |

(52) U.S. Cl.
CPC ............. *F24S 30/425* (2018.05); *F24S 25/12* (2018.05); *F24S 25/70* (2018.05); *F24S 50/20* (2018.05); *F24S 2025/019* (2018.05); *F24S 2030/132* (2018.05); *F24S 2030/134* (2018.05); *F24S 2030/136* (2018.05); *H02S 20/32* (2014.12); *Y02E 10/47* (2013.01)

(58) Field of Classification Search
CPC .................. F24J 2/52; F24J 2/54; F24S 25/12
USPC ........................................................ 126/600
See application file for complete search history.

(56) References Cited

U.S. PATENT DOCUMENTS

| 4,515,148 A | 5/1985 | Boy-Marcotte et al. |
| 4,968,355 A * | 11/1990 | Johnson .............. H01L 31/0547 |
| | | 136/246 |

(Continued)

FOREIGN PATENT DOCUMENTS

| FR | 3001793 A1 | 8/2014 |
| GB | 2235786 A | 3/1991 |

(Continued)

*Primary Examiner* — Gregory L Huson
*Assistant Examiner* — Nikhil P Mashruwala
(74) *Attorney, Agent, or Firm* — Michael Soderman

(57) ABSTRACT

The invention relates to a tracking device (1) for solar modules (2a) with a series of posts (3) arranged along a longitudinal axis. A crossmember (6) is pivotably mounted on each post (3), and said crossmembers (6) are pivotable about a common pivot axis (S) extending parallel to the longitudinal axis. There is fastened to each crossmember (6) a toothed ring (7) of which the toothing (7a) is in engagement with a motor-driven toothed wheel (8) mounted on the respective post (3). Also provided is a positive guide means which forms a safeguard against a transverse displacement of the toothed wheel (8) relative to the toothed ring (7). Each toothed wheel (8) is mounted on the side of the respective post (3).

14 Claims, 6 Drawing Sheets

(56) References Cited

U.S. PATENT DOCUMENTS

| | | | | |
|---|---|---|---|---|
| 9,022,020 | B2* | 5/2015 | Mills | H01L 31/054 |
| | | | | 126/572 |
| 9,217,585 | B2* | 12/2015 | De Cillia | F24S 30/42 |
| 9,285,139 | B2* | 3/2016 | Page | F24S 23/81 |
| 2011/0100355 | A1* | 5/2011 | Pedretti | F24S 23/74 |
| | | | | 126/607 |
| 2011/0162692 | A1* | 7/2011 | Giacalone | F24S 23/74 |
| | | | | 136/248 |
| 2013/0056000 | A1* | 3/2013 | Perrin | F24S 40/80 |
| | | | | 126/606 |
| 2014/0338659 | A1 | 11/2014 | Corio | |
| 2018/0091089 | A1* | 3/2018 | Lange | H02S 20/32 |

FOREIGN PATENT DOCUMENTS

| | | |
|---|---|---|
| WO | 2009040065 A2 | 4/2009 |
| WO | 2013190196 A2 | 12/2013 |

* cited by examiner

TRACKING DEVICE

CROSS REFERENCE TO RELATED APPLICATIONS

This application is the U.S. national stage of International Application No. PCT/EP2015/062074, filed on 2015 Jun. 1.

BACKGROUND

The invention relates to a tracking device for solar modules.

Such a tracking device is known from WO 2013/139745 A1. This tracking device comprises a row of posts, each of which is oriented along a vertical axis, with the row extending along a longitudinal axis. At the top of each post, a crossmember is pivotably mounted, with the crossmember being arranged offset from the pivot point; i.e. the pivot axis. The crossmember is rotatable for pivoting a tilting rail to which solar modules are mounted. This rotating motion is performed by means of a rotation unit at the top of a post. The rotation unit comprises a worm gear unit with an electric drive.

The tracking device is used for aligning the solar modules with the position of the sun. Preferably, for this purpose, the pivot axis of the solar modules is aligned in the North-South direction so that the solar modules can be moved by the pivot motion from an East alignment to a West alignment, and vice versa.

The disadvantage with this tracking device is that the pivot mechanism for the solar modules is relatively complex. It is particularly disadvantageous that solar module arrangements with a plurality of posts also require a large number of drives. Finally, it is disadvantageous that these drives sit at the top of the posts, making the drives difficult to access for installation, maintenance and repair work.

SUMMARY

The invention relates to a tracking device (1) for solar modules (2a) with a series of posts (3) arranged along a longitudinal axis. A crossmember (6) is pivotably mounted on each post (3), and said crossmembers (6) are pivotable about a common pivot axis (S) extending parallel to the longitudinal axis. There is fastened to each crossmember (6) a toothed ring (7) of which the toothing (7a) is in engagement with a motor-driven toothed wheel (8) mounted on the respective post (3). Also provided is a positive guide means which forms a safeguard against a transverse displacement of the toothed wheel (8) relative to the toothed ring (7). Each toothed wheel (8) is mounted on the side of the respective post (3).

DETAILED DESCRIPTION

The task of the present invention is to design a tracking device of the type mentioned at the beginning such that the tracking device possesses high functionality while requiring relatively little engineering effort.

For solving this problem, the features of Claim 1 have been provided. Advantageous embodiments and expedient further developments of the invention are described in the subclaims.

The invention relates to a tracking device for solar modules with a series of posts arranged along a longitudinal axis. A crossmember is pivotably mounted on each post, and said crossmembers are pivotable about a common pivot axis extending parallel to the longitudinal axis. There is fastened to each crossmember a toothed ring of which the toothing is in engagement with a motor-driven toothed wheel mounted on the respective post. Also provided is a positive guide means which forms a safeguard against a transverse displacement of the toothed wheel relative to the toothed ring. Each toothed wheel is mounted on the side of the respective post.

This tracking device according to the invention is characterized in that it has a simple design and robust construction so that the device can, on the one hand, be installed and mounted with little effort and, secondly, it will function reliably even in the case of external interference factors.

An essential aspect of the invention consists of the arrangement of the toothed wheels on the sides of the posts. This guarantees simple and fast mounting of the drive system to the posts of the solar module arrangement.

This result is achieved, on the one hand, due to the fact that the toothed wheels are not arranged at the top of the posts, but instead, at considerably lower mounting heights, so that the toothed wheels are easily accessible to the installation personnel without using ladders or the like. This advantage is achieved by the fact that each toothed ring is arranged at the underside of the respective crossmember. The mounting location of the toothed wheels on the post is thus offset downwards, in accordance with the dimensions of the toothed ring.

Another advantage of mounting each toothed wheel on the side of the respective post consists of the fact that drive means, such as a shaft driving the toothed wheel, need not be routed through the post, thus eliminating the need for corresponding procedures to be implemented on the post.

Particularly advantageously, a common shaft driven by a centralized drive means is routed through the toothed wheels.

In this case, the shaft runs next to the post, parallel to the longitudinal axis.

Advantageously, the arrangements of the toothed ring and of the associated toothed wheel are designed identically for all the posts.

As a result, the entire drive system for tracking the solar modules can be simply mounted on the posts.

An additional essential aspect of the invention consists of the fact that each toothed wheel and the sector of the toothed ring engaging with this toothed wheel are secured against transverse displacements by a positive guide means. Thus, even if an influence is exerted by external interference factors, the toothed ring will run perfectly on the toothed wheel, thereby enabling a correspondingly reliable tracking motion of the solar modules relative to the current position of the sun.

According to a first variant, the positive guide means has two guide elements arranged on opposite sides of a toothed wheel, and said guide elements have projections extending into the area of the toothed ring to form low-backlash guides for the toothed ring.

This variant has the advantage that the positive guide means is arranged only locally in the area of the toothed wheel, thus only a small amount of material is required to form the positive guide means.

Advantageously, each toothed ring is configured as a circular arc, with the teeth being arranged on the outer circumference of the ring.

Matched to this, according to a second variant, the positive guide means is formed by guide segments in contact with side walls of the toothed ring, said side walls being adjacent to the outer circumference of the toothed ring, and said guide segments extending into the area of the associated toothed wheel to form low-backlash guide means for this toothed wheel.

Here, the guide segments extend over the entire length of the toothed ring.

In this case, the positive guide means advantageously performs an additional function in that it effects stabilization of the toothed ring.

This is the case particularly if the guide segments are formed by profiles mountable on the toothed ring.

If the toothed ring consists of individual, modular toothed ring segments, the profiles forming the guide segments can be used for joining the toothed ring segments together by means of a positive and non-positive fit.

Alternatively, the guide segments are configured as one piece with the toothed ring.

Here, the toothed ring advantageously forms a profile with the guide segment.

According to an advantageous embodiment of the invention, a fork-shaped counter-bracket is mounted on each post, thus forming a guide means for the toothed ring.

This results in smooth, even running of the toothed ring.

For this purpose, additionally or alternatively, at least one support roller can be provided on each post for supporting the toothed ring.

BRIEF DESCRIPTION OF THE DRAWINGS

The invention is explained below with reference to the drawings. They show:

FIG. 4a: Enlarged view of a detail from FIG. 4.

DETAILED DESCRIPTION OF THE PREFERRED EMBODIMENTS

Figure 1:
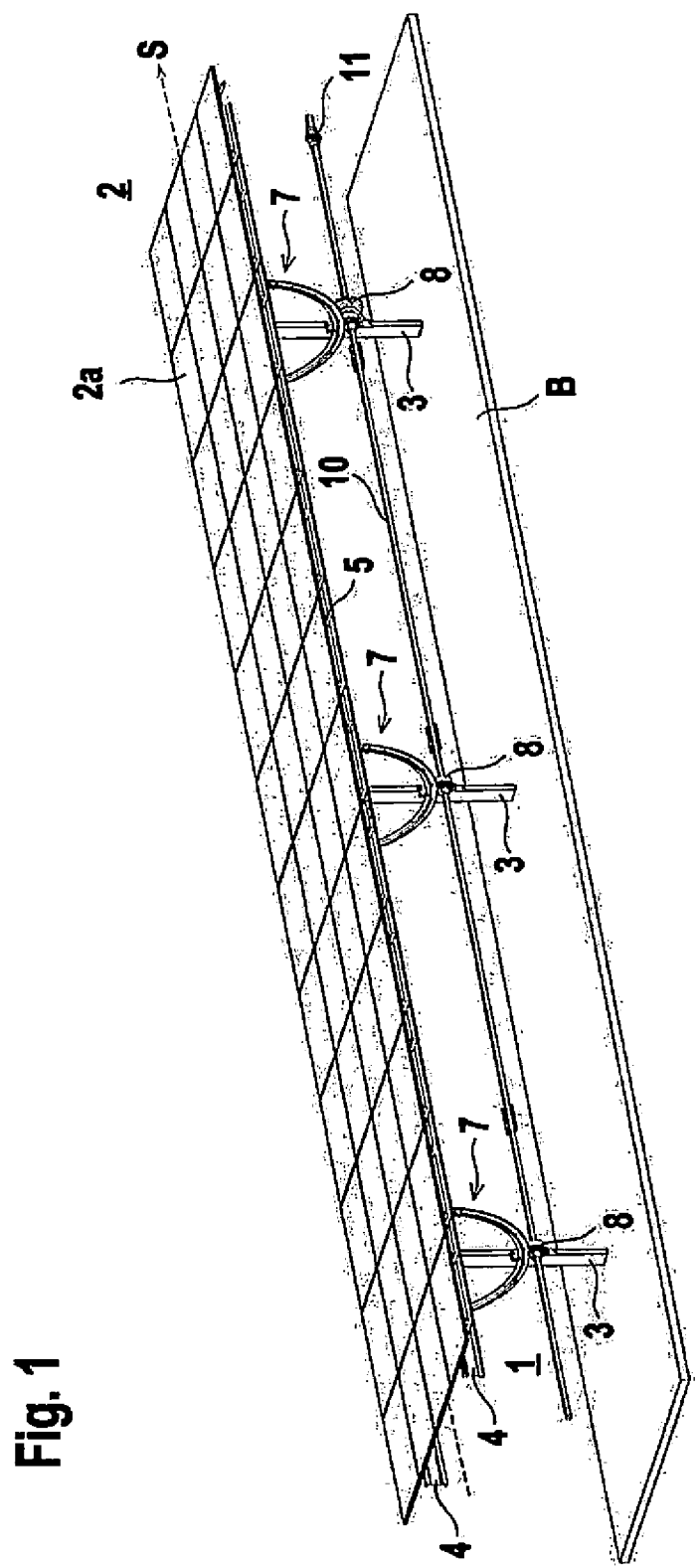
FIG. 1: Exemplary embodiment of the tracking device according to the invention for a solar module arrangement.

FIG. 1 shows an exemplary embodiment of the tracking device 1 according to the invention for a solar module arrangement 2. The solar module arrangement 2 is supported by a support structure having, in the present case, three identically designed posts 3 that are anchored in a base B and whose longitudinal axes are each oriented vertically. Here, the posts 3 are arranged equidistantly along a longitudinal axis, although the equidistant arrangement is not mandatory.

The identically designed, rectangular solar modules 2a of the solar module arrangement 2 are supported by two identically designed longitudinal members 4 running parallel to each other. The solar modules 2a with module carriers 5 are supported on these longitudinal members 4. The assembly thus formed constitutes a so-called table. Generally, the arrangement from FIG. 1 can also be expanded to include several tables arranged one behind the other, with the posts 3 of all the tables being arranged along a common longitudinal axis.

The solar module arrangement 2 is pivotable by means of the tracking device 1 around a pivot axis S running parallel to the longitudinal axis of the posts 3. Advantageously, the solar module arrangement 2 is installed such that the pivot axis S runs in the North-South direction. This allows pivoting the solar module arrangement 2 between an East and a West orientation by means of the tracking device 1, thus allowing said arrangement to be adjusted to the position of the sun.

Figure 2:
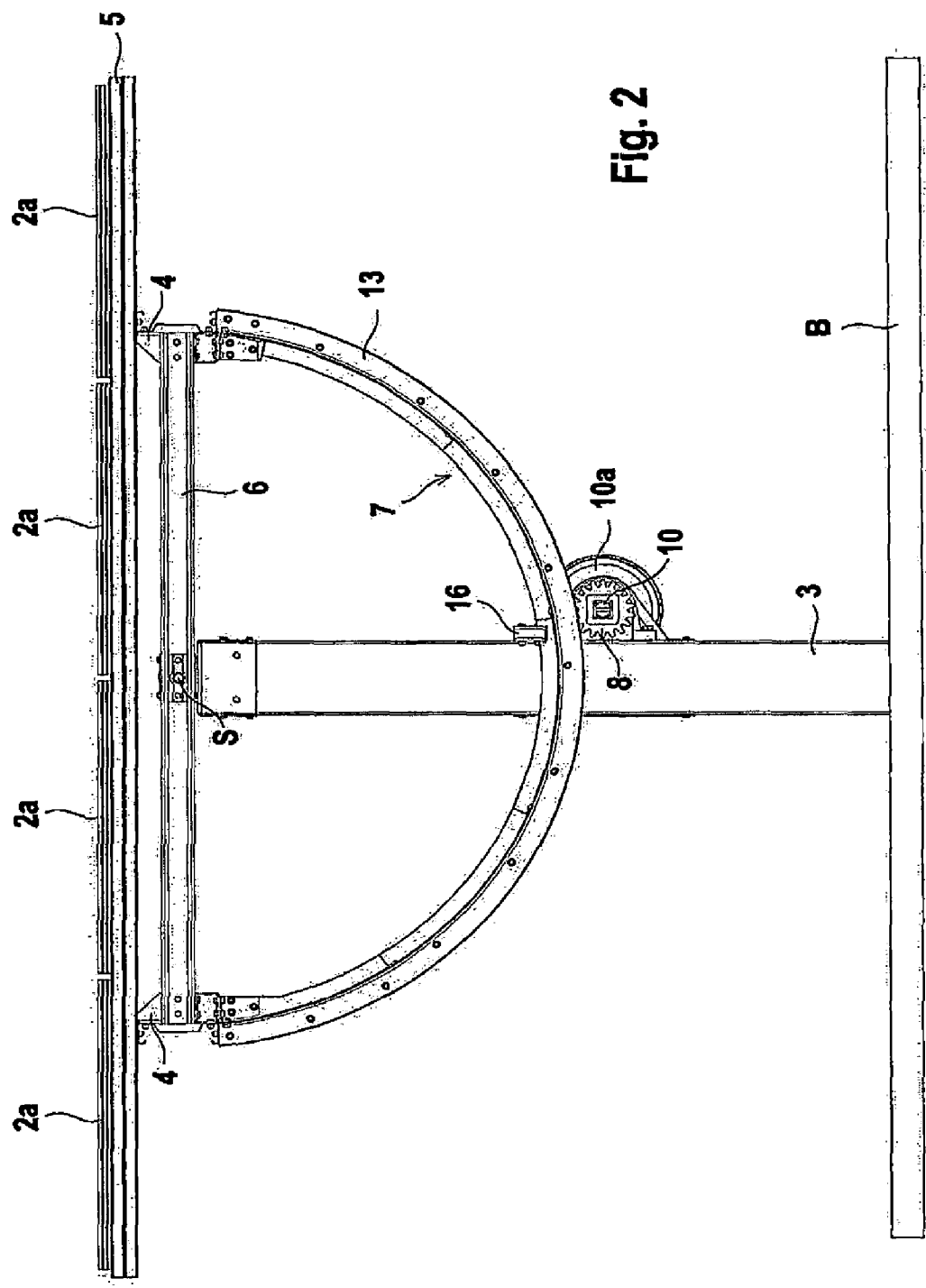
FIG. 2: Lateral view of a post, as well as components associated with the latter, of the tracking device according to FIG. 1.
Figure 3:
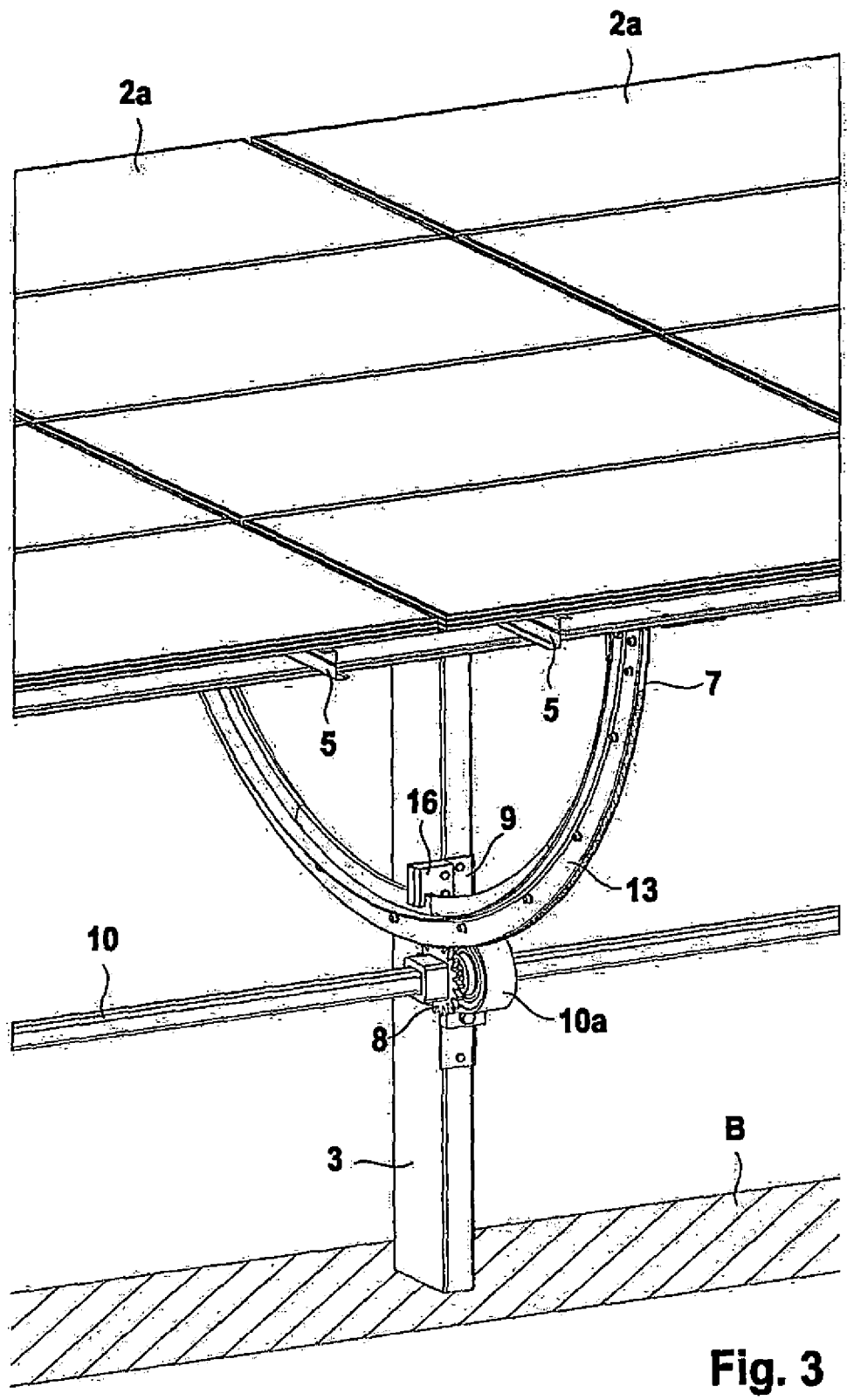
FIG. 3: Perspective view of the arrangement according to FIG. 2.

The components of the tracking device 1 are shown in FIG. 1 as well as in FIGS. 2 and 3, which depict an individual post 3. Components of the tracking device 1 are provided in an identical manner on each of the posts 3.

As can be seen in particular in FIG. 2, a crossmember 6 is pivotably supported on the top of post 3, with the pivot axis S running through the center of the crossmember 6 (perpendicular to the drawing plane). This crossmember 6 supports the longitudinal members 4.

A toothed ring 7 and a toothed wheel 8 are provided as the components of the tracking device 1. The toothed ring 7, which forms a semicircular arc, is mounted to the underside of the crossmember 6 in the area of the latter's longitudinal ends. The toothed wheel 8 associated with the toothed ring 7 is mounted on the post 3. For this purpose, as shown in FIG. 3, a bracket 9 receiving the toothed wheel 8 is mounted on, preferably by being bolted to, the side of the post 3.

The toothed ring 7 is dimensioned such that its lowest point lies approximately at half the height of the post 3. In this area, the toothed wheel 8 is also mounted so that its teeth engage with the toothing 7a of the toothed ring 7.

Figure 4:
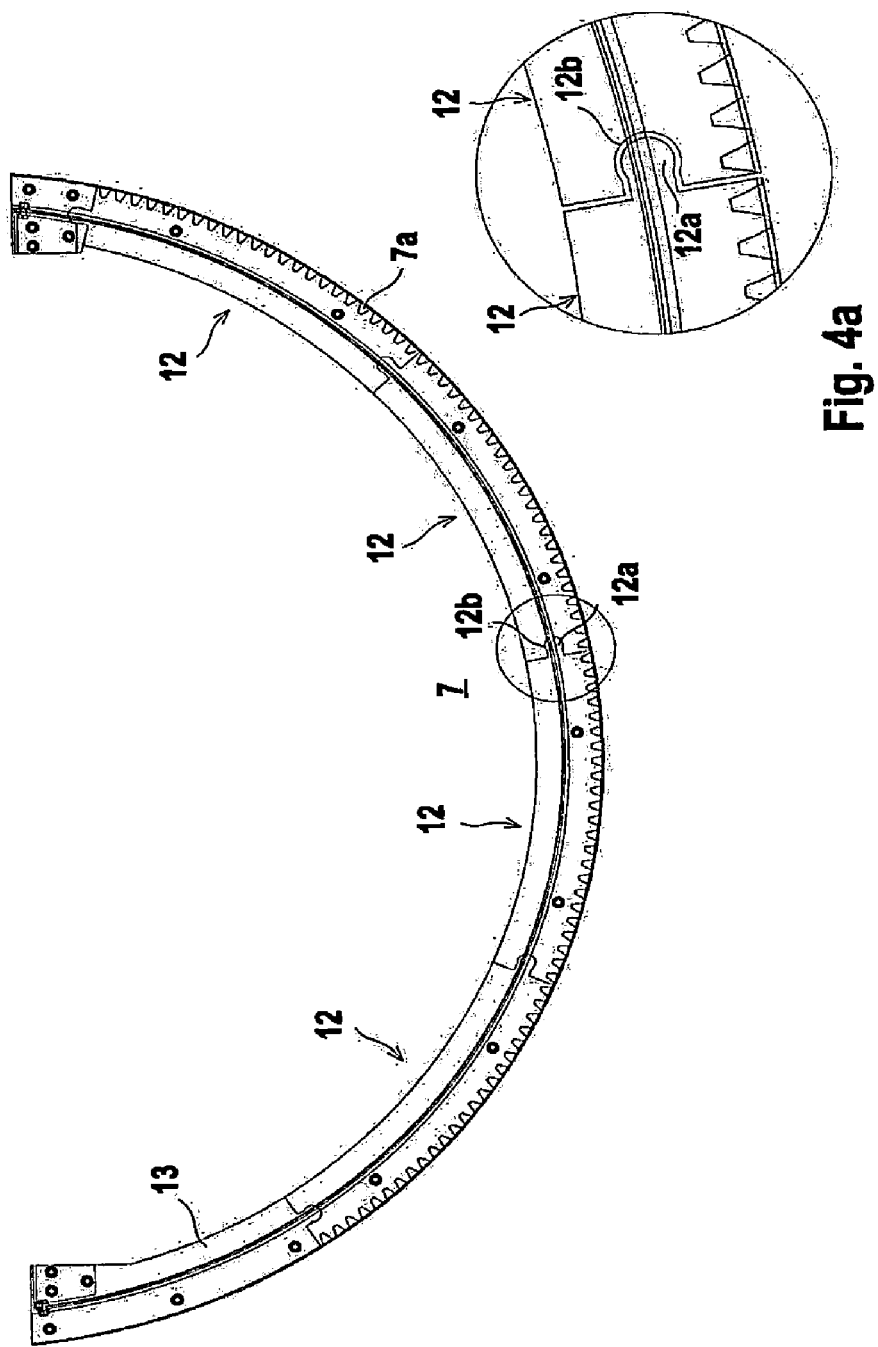
FIG. 4: Individual view of a toothed ring for the tracking device according to FIG. 1.

As can be seen from the detail view of the toothed ring 7 from FIG. 4, the toothing 7a is located on the outer circumference of the toothed ring 7.

Each toothed wheel 8 has a central bore that is not rotationally symmetrical. A shaft 10 passes through the bores of all the toothed wheels 8, said toothed wheels 8 being non-rotatably supported on the shaft 10. The shaft 10 is driven by a single drive 11, said drive 11 being arranged at the end of the shaft 10 in the arrangement from FIG. 1. The shaft 10 is supported by the bearings 10a, which are mounted on the brackets 9 of the posts 3.

Drive 11 rotates the shaft 10, and thus simultaneously also all of the toothed wheels 8. As a result, the toothed rings 7 are moved along the toothed wheels 8, thereby simultaneously pivoting the crossmembers 6, and thus the entire solar module arrangement 2, around the pivot axis S.

If the arrangement according to FIG. 1 is expanded to comprise multiple tables, all of the toothed wheels 8 of all the tables can be supported on a shaft 10 so that the pivot motion of the solar module arrangement 2 of all the tables can be performed by a single drive 11. The drive 11 is then advantageously located in the center of the arrangement of the tables.

As shown in FIG. 4, the toothed ring 7 consists of a plurality of toothed ring segments 12. As is shown in detail in FIG. 4a, the toothed ring segments 12 have tabs 12a or recesses 12b at their longitudinal ends. By inserting a tab 12a at one end of a toothed ring segment 12 into the recess 12b at the longitudinal end of a second toothed ring segment 12, the toothed ring segments 12 can be joined with each other and held firmly in their intended positions. Because, as shown in FIG. 4a, each tab 12a possesses a neck at the end of the body of the tooth ring segment 12, which neck is narrower than the adjacent head portion, this tab cannot be pulled out of the recess 12*b*, which is matched to the contour of the tab 12*a*.

In order to achieve a positive and non-positive connection between the toothed ring segments 12, L-shaped profiles 13 are mounted on both side walls of the toothed ring 7, which side walls are adjacent to the toothing 7*a* (FIGS. 2, 3, 4, 5, 5*a*, 6). The profiles 13 preferably consist, as do the toothed ring segments 12, of cast metal parts. The two L-shaped profiles 13 are designed with mirror symmetry relative to the symmetry axis of the toothed ring 7. Each of the profiles 13 extends over the entire length of the toothed ring 7. In the present case, the profiles 13 consist of profile pieces bolted to the toothed rings.

Figure 5:
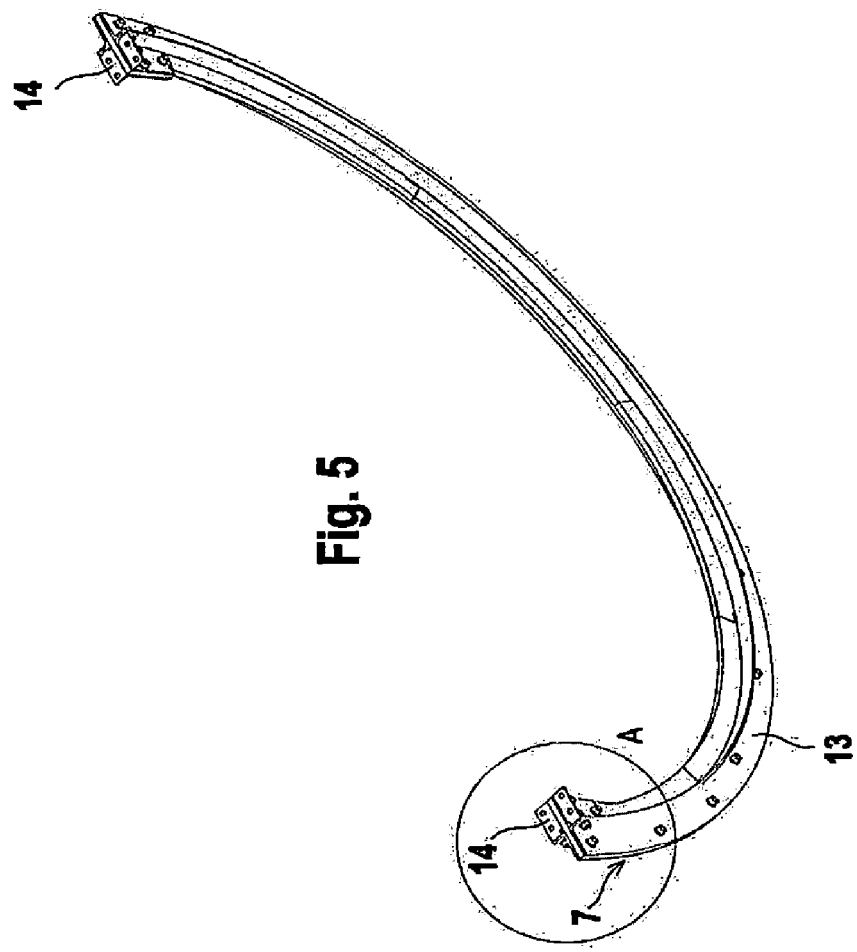
FIG. 5: Perspective view of the toothed ring according to FIG. 4.
Figure 5A:
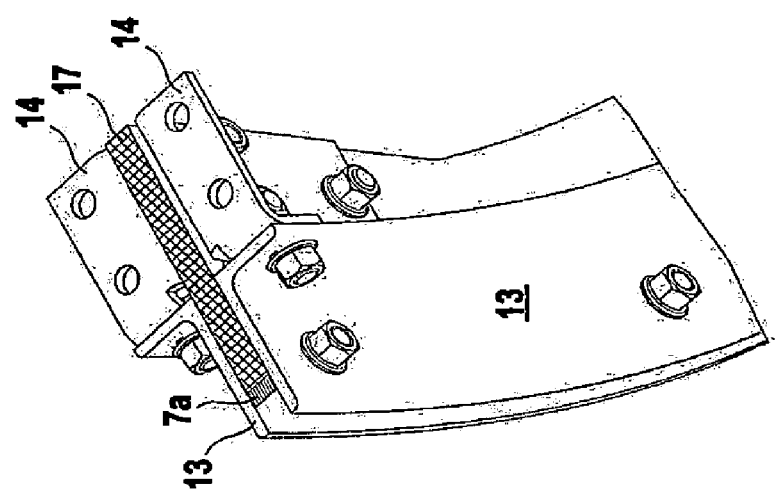
FIG. 5a: Enlarged view of a detail from FIG. 5.

As shown particularly in FIGS. 5, 5*a*, receiving segments 14 are provided at the longitudinal ends of the profiles 13, by means of which segments the toothed ring 7, with the profiles 13, can be bolted to the underside of the crossmember 6.

Figure 6:
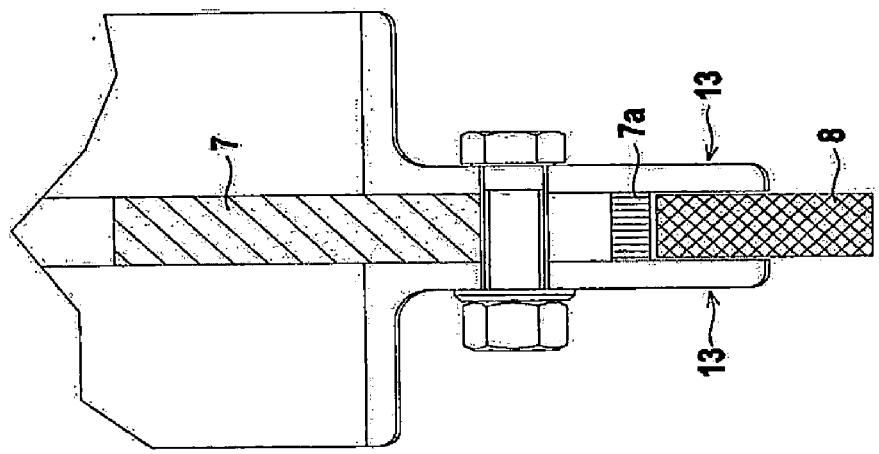
FIG. 6: Sectional view of the toothed ring according to FIGS. 4 and 5 with an associated toothed wheel.

As shown particularly in FIG. 6, the legs of the L-shaped profiles 13, which are adjacent to the toothed ring 7, protrude beyond the toothing 7*a* of the toothed ring 7. The segments of the profiles 13 protruding beyond the toothing 7*a* thus form guide segments that form a low-backlash guide means for the toothed wheel 8. This provides a positive guide means protecting the toothed wheel 8 and the toothed ring 7 against undesirable transverse displacements.

The arrangement according to FIG. 6 can also be further designed with the profiles 13 and the toothed ring 7 being formed in one piece and constituting a single profile.

Figure 7:
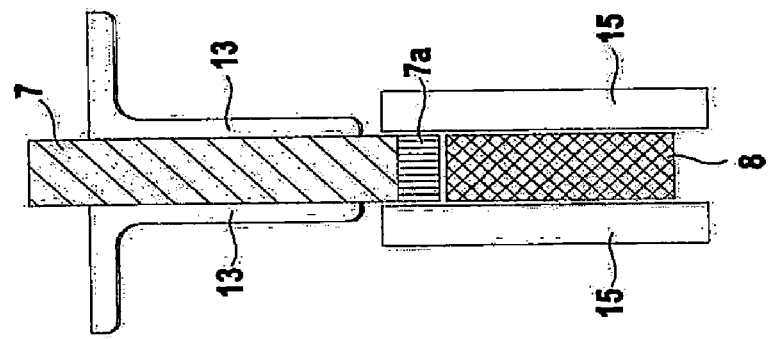
FIG. 7: Variant of the arrangement according to FIG. 6.

FIG. 7 shows a variant of the arrangement according to FIG. 6. In this case, the legs of the L-shaped profiles 13 in contact with the toothed ring 7 are shorter, so that now the lower area of the toothed ring 7 protrudes with the toothing 7*a* beyond these profiles. For forming a guide means, two identically configured, disk-shaped guide elements 15 are provided laterally with respect to the toothed wheel 8. These guide elements 15 protrude radially beyond the toothed wheel 8. The areas of the guide elements 15 protruding beyond the toothed wheel 8 form low-backlash guides for the lower area of the toothed ring 7 with the toothing 7*a*, thus providing a safeguard against transverse displacement between the toothed ring 7 and the toothed wheel 8.

As shown in FIGS. 2 and 3, a fork-shaped counter-bracket 16 is mounted on the bracket 9, which is mounted to a post 3. The fork-shaped receiving element of the counter-bracket 16 guides the top portion of the toothed ring 7 in a low-backlash manner, thus safeguarding the toothed ring 7 against transverse motions when pivot motions are performed.

In addition, support rollers (not shown) can also be provided on the bracket 9, to support the toothed ring 7 from below, thus ensuring further stabilization of the toothed ring 7.

LIST OF REFERENCE NUMERALS (1) Tracking device
(2) Solar module arrangement
(2*a*) Solar module
(3) Post
(4) Longitudinal member
(5) Module carrier
(6) Crossmember
(7) Toothed ring
(7*a*) Toothing
(8) Toothed wheel
(9) Bracket
(10) Shaft
(10*a*) Bearing
(11) Drive
(12) Toothed ring segment
(12*a*) Tab
(12*b*) Recess
(13) Profile
(14) Receiving segment
(15) Guide element
(16) Counter-bracket
(B) Base
(S) Pivot axis

The invention claimed is:

1. A tracking device (1) for solar modules (2*a*) with a series of posts (3) arranged along a longitudinal axis, wherein a crossmember (6) is pivotably mounted on each post (3), and wherein the crossmembers (6) are pivotable about a common pivot axis (S) extending parallel to the longitudinal axis, characterized in that there is fastened to each crossmember (6) a toothed ring (7) of which the toothing (7*a*) is in engagement with a motor-driven toothed wheel (8) mounted on the respective post (3), that a positive guide means is provided which forms a safeguard against a transverse displacement of the toothed wheel (8) relative to the toothed ring (7) and/or that each toothed wheel (8) is mounted on the side of the respective post (3) and wherein the positive guide means has two guide elements (15) arranged on opposite sides of a toothed wheel (8), the said elements have protrusions extending into the area of the toothed ring (7) to form low-backlash guides for the toothed ring.

2. A tracking device according to claim 1, characterized in that a common shaft (10) driven by a central drive (11) passes through the toothed wheels.

3. A tracking device according to claim 2, characterized in that the shaft (10) runs next to the post (3), parallel to the longitudinal axis.

4. A tracking device according to claim 1, characterized in that the arrangements of the toothed ring (7) and of the associated toothed wheel (8) are designed identically for all the posts (3).

5. A tracking device according to claim 1, characterized in that each toothed ring (7) has a circular-arc shape, with the toothing (7*a*) being arranged on the outer circumference of the toothed ring.

6. A tracking device according to claim 5, characterized in that the positive guide means is formed by guide segments located adjacent to side walls of the toothed ring (7), said side walls being adjacent to the outer circumference of the toothed ring, and said guide segments extending into the area of the associated toothed wheel (8) to form low-backlash guides for this toothed wheel (8).

7. A tracking device according to claim 6, characterized in that the guide segments extend over the entire length of the toothed ring (7).

8. A tracking device according to claim 6, characterized in that the guide segments are formed by profiles (13) that are attachable to the toothed ring (7).

9. A tracking device according to claim 8, characterized in that the profiles (13) are designed to be L-shaped.

10. A tracking device according to claim 6, characterized in that the guide segments are formed in one piece with the toothed ring (7).

11. A tracking device according to claim 10, characterized in that the toothed ring (7) forms a profile (13) with the guide segment.

12. A tracking device according to claim 1, characterized in that a fork-shaped counter-bracket (16) is mounted on each post (3), and said counter-bracket forms a guide means for the toothed ring (7).

13. A tracking device according to claim 1, characterized in that at each post (3), at least one support roller is provided for supporting the toothed ring (7).

14. A tracking device according to claim 1, characterized in that each toothed ring (7) consists of a plurality of toothed ring segments (12) joined together by means of a positive and non-positive fit.

\* \* \* \* \*